3,197,854
METHOD OF INSTALLING SANDWICH PANEL SPACER WITH TORQUE-RESISTANT MECHANICAL ANCHORAGE
Frederick W. Rohe, 5191 S. Bradford, Placentia, Calif., and Charles S. Phelan, Tustin, Calif.; said Phelan assignor to said Rohe
Filed Jan. 2, 1963, Ser. No. 248,969
6 Claims. (Cl. 29—455)

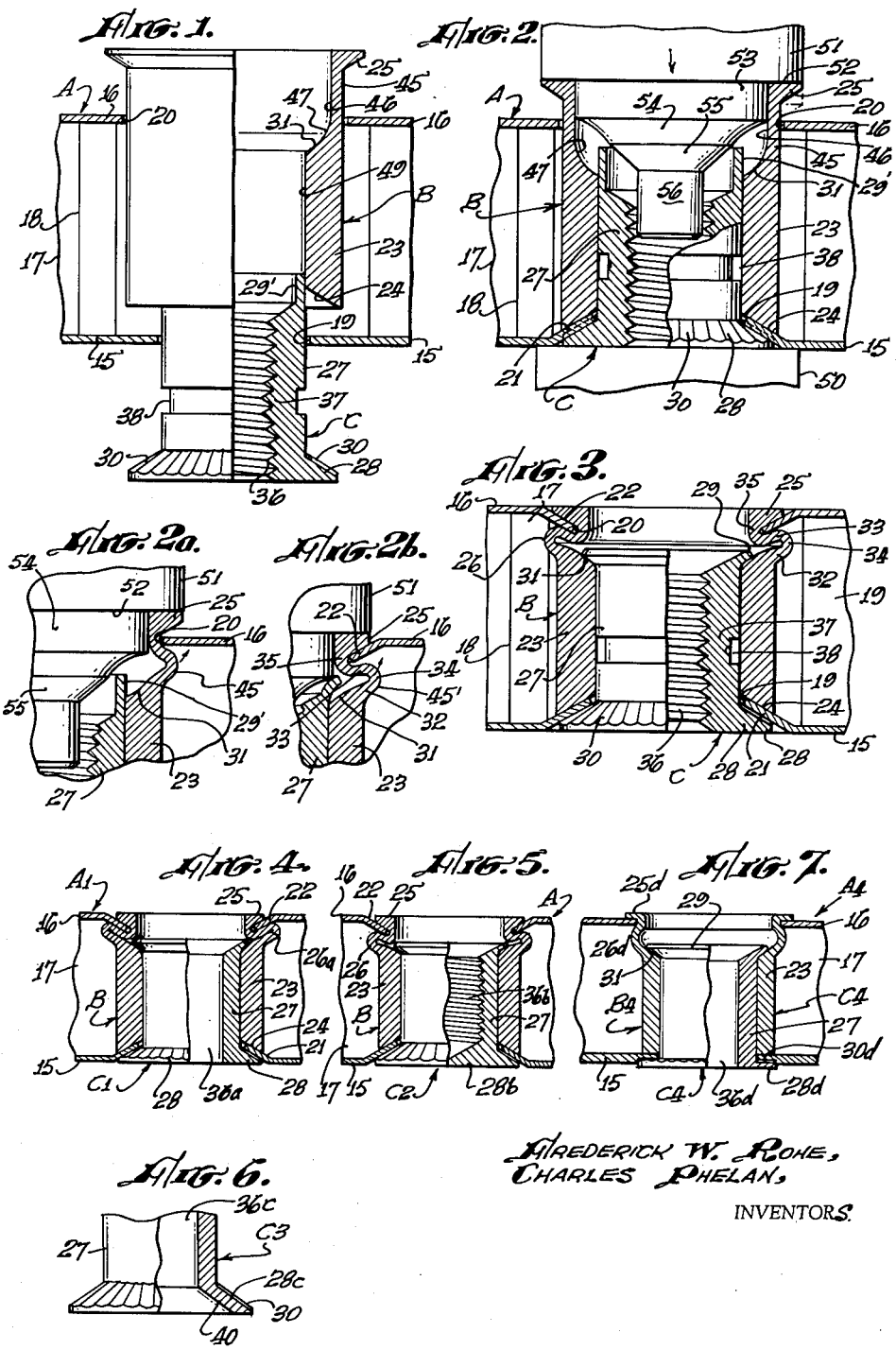

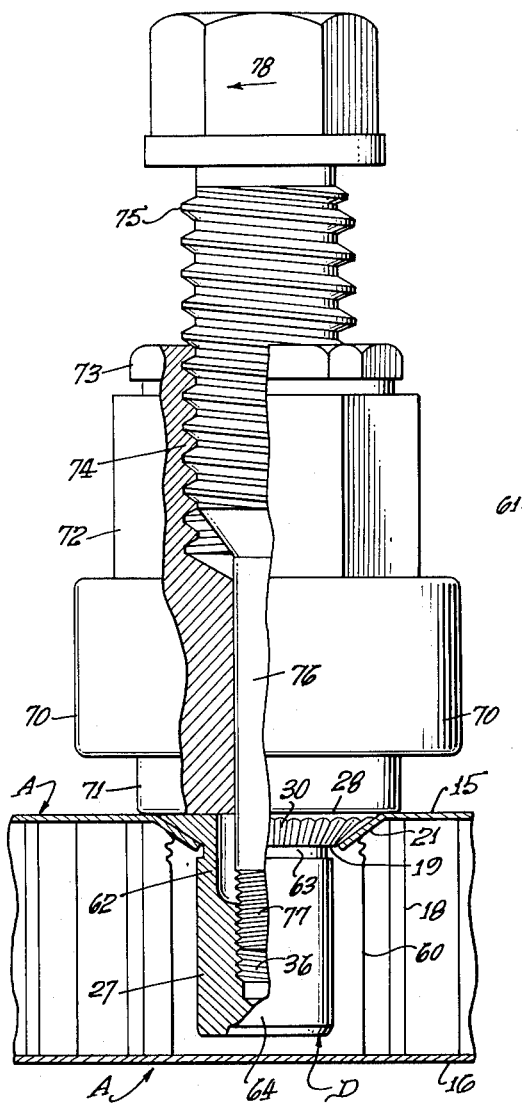

This invention relates to a method of applying fasteners to lightweight sandwich panels such as are commonly employed for interior wall, floor and ceiling structure of airplane cabins etc. The general object of the invention is to provide a method of applying a fastener of the insert or spacer type having improved means for mechanical anchorage thereof to both skin sheets of the sandwich panel structure, and avoiding the necessity for utilizing a potting compound or molding resin for anchoring the fastener in the sandwich structure.

An important object of the invention is to provide a method of applying a fastener having improved means for anchoring it against rotation in a sandwich panel when a threaded stud or bolt is being attached thereto. A common means for attaining such torque-anchorage is to fill the hole in the panel around the insert or spacer with a potting resin in a liquid or plastic state (e.g an epoxy resin). Such a potting compound has some undesirable aspects such as (1) the material is expensive, and (2) in the higher temperature ranges, it softens, loses much of its holding strength, and deteriorates. It is therefore desirable to avoid it if possible. At the same time, the fastener must be anchored to the sandwich panel securely enough to resist the torque imposed upon it when a fastener stud is threaded into it or removed, and in addition, the fastener must resist axial pull applied by the coupled part, tending to pull the fastener out of the panel. Furthermore, in the case of a two-part fastener of the spacer type, the components must be securely anchored against pulling apart.

Attempts have hitherto been made to provide spacer-type fasteners having multiple parts providing mechanical (clamping) anchorage to sandwich panel skin sheets, the parts being coupled to one another by an interference or friction fit between the parts. This type of coupling in spacers is proving to be unsatisfactory to meet the present day requirements for security of coupling.

We have found that with some spacer-type fasteners, it is possible for the fastener to fail at one end, releasing its grip on the one skin sheet, while remaining attached at its other end, and in thus failing, to gouge out a fairly large section of the flimsy core structure between the sheets.

With the foregoing problems in mind, the invention aims to provide a method of applying a fastener having means to anchor it to both skin sheets of a sandwich panel solely by mechanical engagement of the skin sheet or sheets; which will provide adequate torque-anchorage through such mechanical engagement of the skin sheet or sheets; which will maintain secure anchorage in high temperatures such as are imposed on missile structures; a fastener of which both ends can be anchored to respective skin sheets with sufficient grip to actually tear chunks of both skin sheets out of the panel before the grip of either skin sheet will be released; and wherein such gripping engagement of the ends of the fastener with both skin sheets can be developed in successive stages of a unitary fastener-setting operation.

Another object is to provide a method of applying such a fastener having a collapsible section adapted to collapse outwardly during installation of the fastener in a sandwich panel, in order to attain the following desirable results: (a) development of a circumferential fold providing anchorage of an end of the fastener to a skin sheet; and (b) adjustment of the length of the fastener to compensate for variations in core depth and skin sheet thickness of the sandwich panel.

Another object is to provide a method of applying a fastener having means for self-dimpling of a head portion thereof into the material of a sandwich panel skin sheet surrounding an opening therein, and for bringing another part of the fastener into mechanical interlocking engagement with the inner face of the dimpled skin sheet to clamp the same against the rear face of the head. Thus, the invention avoids the necessity for pre-dimpling of either skin sheet.

More specifically, the invention contemplates a method of applying a two-part spacer-type fastener comprising a plug and a spacer sleeve which are cooperative, during installation, to effect clamping of one skin sheet between one end of the sleeve and an opposed head on the corresponding end of the plug; and to establish positive mechanical interlock between the other skin sheet and the other end of the sleeve by upsetting and outward bulging of a weakened section of the sleeve adjacent the head on said other end of the sleeve.

A further object is to provide a method of applying a spacer-type fastener which, in addition to the characteristics outlined in the previous paragraph, is provided with means for mechanically locking the plug to the spacer sleeve to maintain the clamping engagement between the head of the plug and the opposed end of the sleeve, with the interposed skin sheet.

A further object is to provide a method of applying a spacer-type fastener in which the clamping of the one skin sheet between the plug head and sleeve, the upsetting of the other end of the sleeve into locking engagement with the other skin sheet, and finally, the locking of the plug to the sleeve, occur as consecutive stages of a continuous installation operation in which axial compression is applied to the fastener.

Yet another object is to provide a method of applying such a spacer-type fastener wherein self-dimpling of both skin sheets by the respective ends of the fastener will occur during the continuous progressive setting operation referred to above, in a manner such that, by utilizing countersunk type heads, the respective ends of the spacer can be brought into flush relation to the outer surfaces of the panel.

A further object is to provide a method of applying a spacer-type fastener having means for anchoring the respective ends thereof to the respective skin sheets of a sandwich panel so securely as to prevent either end of the fastener from becoming released from its respective skin sheet (i.e. so that failure can occur only by tearing away respective fragments of both skin sheets).

Another object is to provide a method of applying such a spacer-type fastener wherein the spacer part has at one end a collapsible section which incorporates a "short column" characteristic such as to insure (1) uniform coaxial collapse and bulging as contrasted to "long column" bending; (2) deformation resistance of sufficiently high value to transmit compressive forces adequate to effect completion of a dimpling and clamping of the opposite skin sheet between the other end of the spacer and the head of the cooperating plug part, with torque-anchoring coining of radial flutes on the shoulder of such head into said opposite skin sheet; and (3) with a filleted cross-section such as to crowd the fold of the collapsing section toward the adjacent skin sheet so as to attain adequate clamping of such adjacent skin sheet between the fold and the opposed head of the spacer.

Based on the foregoing, the invention attains the following improved advantageous results:

(1) Provides complete structural continuity.

(2) Develops full load capability of sandwich structure.

(3) Provides torque-out capacity greater than the strength of its bolt or stud.

(4) Actually increases the strength of the sandwich panel at the fastener area.

(5) Eliminates "crippling" of the core during dimpling by providing columnar support of the area through the spacer component.

Another object of the invention is to provide an improved method of installing an insert or spacer in a lightweight sandwich panel, and one which can be carried out by optional use of several different types of tooling (either power press or portable squeeze tooling of either hydraulic, pneumatic or screw jack type).

Another object is to provide a method of applying a fastener for improved mechanical anchorage in a lightweight sandwich panel, which fastener can be made available either in the form of an insert or a spacer, either with or without internal threads for anchoring a threaded stud or bolt, and in any of various selective head styles.

A further object is to provide a method of applying such a fastener which can be adapted to accumulated tolerances of sandwich dimensions, with variations of as much as .020 inch above or below a specified dimension.

A further object is to provide a method of applying such a fastener which can be installed from either side of a sandwich panel.

Other objects and advantages will become apparent in the ensuing specification and appended drawing in which:

FIG. 1 is a combined axial sectional-elevational view of a fastener of a spacer type, including a plug with threaded bore for attachment of threaded stud, shown in an initial stage of installation in a lightweight sandwich panel;

FIGS. 2, 2a and 2b are combined elevational-axial sectional views of the same, shown in succeeding stages of installation;

FIG. 3 is a combined sectional-elevational view of the same, fully installed in a sandwich panel of intermediate thickness within the range to which the fastener is applicable;

FIG. 4 is a sectional-elevational view of a fastener of the spacer type, installed in a sandwich panel of minimum thickness within the range to which the fastener is applicable, and embodying a modified form of the invention wherein the plug has an unthreaded bore;

FIG. 5 is an axial sectional view of a spacer-type fastener embodying another modified form of the invention wherein the plug has a closed head and a blind thread;

FIG. 6 is a view, partially in axial section and partially in elevation, of the plug member of a spacer type fastener embodying a modified form of head which can be utilized in the plug member of any of the several forms referred to above;

FIG. 7 is a partially sectional, partially elevational view of a blind fastener of the spacer type, embodying another modified form of head which can be utilized in any of the several forms of the invention referred to above; and installed in a sandwich panel of maximum thickness within the range to which the fastener is applicable;

FIG. 8 is a combined sectional-elevational view of a blind-type fastener (for blind installation in a sandwich panel with anchorage to only one skin sheet) embodying the important torque-anchor feature of the invention;

FIG. 9 is an elevational view, partially in axial section, of a screw-jack installation tool embodying the tool feature of the invention and illustrating one embodiment of our improved installation method (as applied to the fastener of FIG. 8);

FIG. 10 is a fragmentary view of the installation tool of FIG. 9, associated with the fastener of FIG. 8 which is shown in fully installed condition in a sandwich panel, partly in elevation and partly in section; and FIG. 11 is a fragmentary sectional view of a modified form of the tool of FIG. 9, adapted to the installation of the spacer type fastener of FIG. 3.

Description

Referring now to the drawings in detail, and FIG. 3 in particular, we have shown therein, as an example of one form of our improved fastener installed in a lightweight sandwich panel A, a spacer-type fastener comprising a spacer sleeve B and a plug C locked therein, both ends of the spacer assembly being locked to the panel A.

Sandwich panel A comprises front and back skin sheets 15 and 16, which may be of lightweight sheet metal such as aluminum alloy, and a low-density core 17 which may be of honeycomb cell structure, with the cell walls (indicated schematically at 18) extending transversely between the skin sheets 15 and 16 and suitably secured thereto at their end edges. The fastener plug C and spacer sleeve B are inserted through an opening 19 in skin sheet 15 and a larger opening 20 in skin sheet 16 respectively. Around opening 19, skin sheet 15 has an inwardly depressed dimple 21 which is clamped between opposed end portions of fastener parts B and C. Around opening 20, skin sheet 16 has an inwardly depressed dimple 22 which is clamped between adjacent, axially-opposed end portions of spacer sleeve B at its opposite end.

Spacer sleeve B comprises a relatively thick-walled sleeve body 23 for a majority of its length, a frusto-conical counterbore 24 at its inner end, mating with the inner face of dimple 21, a head 25 at its outer end, and an outwardly folded annular fold 26 providing a secondary head in opposed, adjacent relation to end head 25, formed by collapsing a weakened section of the sleeve wall, the dimple 22 being mechanically locked between the heads 25 and 26. Sleeve body 23 has a through bore 49, a diameter to freely but snugly receive plug C.

Plug C comprises a tubular neck 27 telescoped into the main sleeve body 23 of spacer B, an integral head 28 at its outer end, and an integral, expanded lip 29 at its inner end. Head 28, in this form of the invention, is of the flush type, having, as its inner face, a frusto-conical shoulder defined by a plurality of raying flutes 30 which are indented into the outer face of dimple 21 and thereby torque-anchored thereto (locking the plug C against rotation in the panel A).

The retainer lip 29 is swaged tightly against a frusto-conical internal shoulder 31 which defines the back end of the thickened sleeve body 23. The auxiliary head 26 comprises a first fold 32, the inner face of which is substantially of the same inclination and a flush continuation of the shoulder 31, and a second fold 33 which is reentrant and is engaged against the inner side of skin sheet dimple 22. Fold 33 is joined to fold 32 by a peripheral bend 34 and to head 25 by an inner reverse bend 35, the series of folds and bends being of S-section convolution.

The dimple 21 of skin sheet 15 is tightly clamped between head 28 of plug C and counterbored end 24 of spacer B. The dimple 22 is mechanically locked between the outer end head 25 and auxiliary head 26 of spacer B. In some installations, the dimple 22 may be tightly or snugly clamped between these heads as indicated in FIG. 4 (e.g. where the aggregate thickness of panel A including core depth and skin sheet thickness, is less than a predetermined median value for a selected range); whereas in other cases (e.g. where the aggregate panel thickness is greater than the median value) the convolutions 32–35 may not be completely closed, the fold 33 may be disposed short of full mating contact with the inner face of dimple 22, but the inner edge of dimple 22 at the margin of opening 20 will in any event be tightly engaged in the inner bend 35 of the convolutions. FIG. 3 discloses an approximately average condition of folding of secondary head 26.

Because of the tight engagement of the inner edge of dimple 22 in bend 35, and the full seating engagement of the outer face of the dimple against head 25, the spacer of this installation is securely anchored to skin sheet 16 notwithstanding the fact that its collapsed section is not fully closed.

In the particular fastener illustrated in FIG. 3, both of the heads 25 and 28 are of the flush or countersunk type, and the neck 27 of plug C has a threaded bore 36 for reception of the threaded shank of a fastener stud, bolt or the like. Also, the fastener assembly is of a through type, with both ends open so that a stud or bolt can be inserted from either end. The plug C, being torque-anchored to skin sheet 15, will resist the turning torque of a stud or bolt being screwed into or unscrewed from the plug. The torque-anchorage is assisted by the locked connection between the outer end of spacer B and skin sheet 16, plus the locked connection between plug C and spacer B. Where a threaded bore is utilized, a suitable thread lock is also incorporated. Merely by way of example, we have shown an inwardly deformed locking thread section 37 in a weakened annular web section of neck 27, defined at the bottom of an annular external groove 38 therein. Other equivalent thread locks can be used (e.g. of the type embodying a plug of nylon or equivalent material inserted through a radial bore in the wall of neck 27).

*Modified forms* of the spacer-type fastener of FIG. 3 may embody modifications in the plug C and/or spacer B as illustrated in FIGS. 4–7, as follows:

FIG. 4 illustrates a fastener assembly embodying a plug C1 having a smooth cylindrical bore 36a instead of the threaded bore 36 of FIG. 3, and also shows a secondary head 26a of a maximum folded condition (completely bottomed) in a panel A1 of minimum thickness within the fastener range, the assembly being otherwise the same.

FIG. 5 illustrates a fastener assembly embodying a plug C2 having a blind threaded bore 36b the bottom of which is defined by a closed head 28b. Thus, only one end of the spacer is open to receive a fastener stud or bolt, although the spacer extends entirely through the panel A and has both ends secured thereto as in FIG. 3.

FIG. 6 illustrates a plug C3 having a flush head 28c provided with a counterbore 40 at the outer end of bore 36c. The bore 36c may be internally threaded or a smooth cylindrical bore, and in either instance may be either a through bore as illustrated in FIGS. 3 and 4, or a blind bore as illustrated in FIG. 5.

FIG. 7 illustrates a plug C4 having a flat head 28d provided on its back side with a shoulder defined by radial flutes 30d disposed in a flat plane. The head 28d does not dimple the skin sheet 15, although it will become embedded therein substantially to the depth of its flutes 30d, to establish the torque-anchorage.

FIG. 7 also shows a sleeve B4 having a flat head 25d which can be electively utilized in lieu of the flush type head 25 of FIG. 3, and illustrates a secondary head 26d of minimum bulging, in a panel A4 of maximum thickness within the fastener range. FIG. 7 may be regarded as somewhat exaggerated as to the open condition of the convolutions, for all except a few exceptional cases.

Installation

FIG. 1 illustrates the components of the spacer assembly of FIG. 3, as these components exist prior to assembly. The head 25 of spacer B is joined to the main body section 23 thereof by a weakened or thinned neck portion 45 the outer surface of which is a continuation of the outer surface of sleeve body 23, of the same diameter, and the inner wall of which is defined by a counterbore 46. The frusto-conical shoulder 31 defines the bottom of this counterbore. Shoulder 31 is joined to counterbore 46 by a fillet 47 having a radius approximately equal to the difference between the radii of counterbore 46 and the through bore 49. The plug C, at its inner end, has a thinned cylindrical tip 29', defined by a counter bore 37.

The spacer B fits loosely in the aperture 20 of skin sheet 16. The neck 27 of plug C fits loosely in the aperture 19 of skin sheet 15. The two components are inserted from opposite sides of the panel A as indicated.

*Setting* of the fastener is effected by applying opposing forces to the spacer B and plug C respectively, to force them against the respective skin sheets 15 and 16. This can be done, as illustrated in FIG. 2, by supporting the head of plug C against an anvil or bucking member 50 which can be the bed of a press, or a portable locking tool. On the opposite side of the panel A, there is inserted into the open end of the fastener assembly, a setting tool comprising a ram 51 having a radial shoulder 52 for applying pressure to the spacer head 25, a projecting nose 53 having a slightly concave frusto-conical swaging face 54 for engagement with the weakened tip 29' of plug C, an entry cone 55 forwardly of swaging face 54, and a pilot 56 projecting forwardly from cone 54. Pilot 56 is dimensioned for locating fit in the bore 36, 36a, or 36b etc. and prevents radial drift of the tool during the setting operation (which might result in eccentric deformation of tip 29' and weakened section 45).

The setting operation is effected by exerting downward pressure through ram 51 and upward counter pressure through anvil 50, and progresses in several stages, in the following order:

(1) The annular portion of skin sheet 15 around opening 19 (FIG. 2) is clamped between the head 28 of plug C and counterbore 24 of spacer B and the head 28 is indented into the skin sheet, forming the dimple 21. The flutes 30 are embedded in the dimple 21, establishing the torque-anchorage of plug C to skin sheet 15 which resists turning of the plug in the skin sheet when a fastener stud is threaded thereinto, or when torque is applied from any other source.

(2) When dimple 21 is solidly bottomed between countersink 24 (and head 28 in turn solidly bottomed against anvil 50) the weakened section 45 of spacer B commences to collapse under the pressure applied by ram 51, as shown in FIG. 2a. The nose portion 53 of the ram supports the inner wall of weakened section 45 against inward collapse and thus the collapsing is in the outward direction. Since the read 25 is being driven inwardly by ram 51, the outward bulge of section 45 occurs on the inner side of skin sheet 16, while the head 25 approaches the outer face of the skin sheet, approximately as indicated by the arrow in FIG. 2b. Thus the margin of skin sheet 16, at aperture 20, becomes caught between the overhanging head 25 and the bulging section 45' of the spacer.

As the operation progresses, the margin of skin sheet 16 is engaged by head 25 and indented inwardly (FIG. 2b). It then makes engagement with the outward shoulder of the bulging section 45' and commences to apply inward pressure thereto, thus assisting the further collapsing of the section 45'. At its periphery, the collapsing section 45' offers resistance to the inward indenting of skin sheet 16. At the end of the operation, there is developed in the skin sheet 16, around aperture 20, the dimple 22 substantially mating with the inward conical shoulder of head 25, and the auxiliary head 26, 26a or 26d, depending on the thickness of the panel A. The large radius of fillet 47 provides a buttressing characteristic in the base portion of neck 45, which directs the developing fold 45' (FIG. 2a) toward skin sheet 16 as indicated by the arrow in FIG. 2b. The buttressing effect is derived from the graduation in thickness from a maximum at shoulder 31 to a minimum where fillet 47 becomes tangent to the cylindrical wall of counterbore 46. We find that the buttressing feature insures the crimping of secondary head 26 against the margin of skin sheet 16 at aperture 20 to provide adequate clamping engagement of the skin sheet. In attempts to utilize a cross section wherein counterbore 46 was joined directly to an abrupt offset shoulder (at the location of shoulder 31) in a sharp internal corner, we found that the collapsing wall section 45' tended to yield away from skin sheet 16, failing to establish clamping engagement therewith. This difficulty wase overcome by the buttressing effect of fillet 47.

(3) During the final stages of the collapsing operation described above, at a point between the condition shown in FIG. 2a and the fully set condition (e.g. as shown in FIG. 3), the swaging surface 54 of the tool engages lip 29' of the plug C (FIG. 2b) and swages it against the frusto-conical shoulder 31 of sleeve B (FIG. 3) to lock the plug and sleeve together. This operation continues during the final stage of dimpling the head 25 into the skin sheet 16 and forming of the auxiliary head 26, and both operations are completed simultaneously. At the completion, lip 29' is snugly engaged against spacer sleeve shoulder 31 and the entire assembly is locked together with the respective skin sheets clamped in the respective ends of the fastener.

Where the flat heads 25d and 25e, or either of them, are employed, since dimpling does not take place, the collapsing stage will be of lesser extent, and the open type auxiliary head 26d seen in FIG. 7 may be formed. Also, where the flat head 28d is employed, the main body 23d of spacer B4 will normally have a squared or radial end face as shown in FIG. 7, for compressing the skin sheet 15 against the radial flutes 30d of head 28d.

An important feature of the invention is the absorption of tolerances in panel thickness, in the bulge of secondary head 26, 26a, 26d between maximum and minimum collapse. The weakened section 45 has a column length sufficient to provide an adequate amount of bulging to meet the tolerance requirements, yet it has a "short column" characteristic which insures true symmetrical collapse as contrasted to a "long column" characteristic (failing by bending when subjected to compression). The buttressing effect assists in attaining the short column characteristic, in that a very substantial portion of the length of weakened section 45 is of more than the minimum thickness.

The short column feature is further characterized by having strength to remain unyielding until the head 28 of plug C has become fully seated in or against skin sheet 15, with its flutes 30 fully embedded therein.

*The full blind insert assembly of FIG. 10* comprises a single fastener part D mounted in a sandwich panel A in a blind hole 60 extending from an aperture in the one skin sheet 15 and having a closed bottom defined by the other skin sheet 16. The insert D has a head 28 provided with a fluted shoulder 30 the flutes of which are embedded in the skin sheet dimple 21 and locked thereto by a bulged auxiliary head 61 formed in a weakened section of the insert. This weakened section, prior to bulging, is shown at 62 in FIG. 8. A shallow annular groove 63 is provided therein at the inner extremity of head 28. Beyond the weakened section 62, the insert has a relatively thick main body section 27 provided with an internal thread 36 to receive a threaded fastener stud. Since the insert is a fully blind type, it will normally have a closed bottom 64.

The auxiliary head 61 engages the margin of dimple 21 to lock the flutes 30 in an embedded engagement with the dimple 21, thus maintaining the torque-anchorage attachment of the insert to the skin sheet 15.

*Installation of insert D* is effected by the use of the tool shown in FIG. 9. The tool comprises an anvil 70 having a head 71 for pressure engagement against the insert head 28, a flat-sided shank 72 for holding engagement by a suitable wrench, and having a suitable nut 73 provided with an internal left hand thread 74.

A chuck bolt 75 is threaded through the nut 73 and has an integral reduced stem 76 the end of which is provided with a male thread 77 for coupling with the internal thread 36 of insert D.

*The process of installation of insert D* involves the following steps:

(1) Insert D is threaded onto the tip 77 of chuck bolt 75 until its head 28 snugly engages the anvil head 71.

(2) With the hole 19 bored in the skin sheet 15, but with the sheet 15 remaining flat and undimpled, the insert D is pushed through the hole 19 and the head 28 is forced into the sheet 15, dimpling it. This can be done by holding the anvil 70 in one hand and striking the head of the chuck bolt 75 a hammer blow (or it can be done by applying pressure in an arbor press).

(3) Wrenches are then applied to the flat faced shank 72 of the anvil and to the head of the bolt 75. The chuck bolt is turned in the direction indicated by the arrow 78 in FIG. 9, thus backing the chuck bolt out of the nut 73, retracting the stem 76 in the anvil 70, and thereby applying a pull to the body 27 of the insert while simultaneously applying reactive pressure of anvil head 71 against insert head 28. The resulting compression applied to the weakened section 62 causes the latter to bulge outwardly to produce the auxiliary head 61 which engages the edge of dimple 21 to lock the embedded flutes 30 in torque-anchoring engagement with the dimple.

*An alternate method of installing the spacer of FIG. 3* may utilize the tool of FIG. 9 in slightly modified form, as illustrated in FIG. 11. In the modified tool, the anvil 70a is provided with a riveting head 54a on the end of a reduced tubular neck 80 of the correct diameter to fit into the counterbore 46 of spacer B. The stem 76 of the chuck bolt 75 extends through the neck 80 and has its threaded tip 77 threaded full-length through the body 27 of spacer sleeve C and threaded into an internally threaded washer or nut 81 adapted to compressively engage the head 28 of plug C. Anvil 70a has a radial annular shoulder 71a for compressive engagement against the head 25 of spacer sleeve B.

When the tool is first attached to the spacer assembly, the anvil 70a is retracted sufficiently to permit the insertion of the stem tip 77 through the plug C and into the nut 81. The tool is then operated in the manner described above in connection with insert D, applying a pull through the stem 76 to the plug C while simultaneously applying reactive pressure through the anvil shoulder 71a to the spacer head 25. The series of setting steps described above in connection with FIGS. 2, 2a and 2b then occurs, in the same order, the skin sheet 15 first being dimpled between head 28 and the end of sleeve body 23; the weakened section 61 of insert D then being collapsed and the head 25 dimpled into skin sheet 16; and finally, the riveting head 54a engaging the lip 29' of plug C and swaging it outwardly against spacer shoulder 31.

We claim:

1. A method of fabricating a sandwich panel and spacer-type fastener assembly, comprising: providing a hole extending through a low density core of the panel and terminating in apertures in respective skin sheets of the panel; inserting through the aperture of one of said skin sheets a spacer sleeve having an outer end provided with a head engageable against the outer face of the one skin sheet around said aperture and a tubular weakened section joining said head to its main sleeve body, and having an inner end provided with a countersink; inserting through the aperture of the other skin sheet and into the spacer sleeve a plug having an outer end provided with a head having a fluted under face and an inner end provided with a thinned tubular tip defined by a counterbore therein, said thinned tubular tip of the plug being located adjacent the weakened section of said spacer sleeve; and successively applying opposed compressive forces to the respective outer end heads and to said tip so as to sequentially effect (1) dimpling of said plug head into the outer surface of said other skin sheet around its said aperture (2) clamping of said other skin sheet between said countersink and said plug head (3) embedding said fluted underface into the dimple thus formed (4) upon completion of said embedding, increasing the compression in the fastener and thereby causing said weakened sleeve section to collapse outwardly adjacent the inner face of said one skin sheet around its aperture, to provide an annular bulge, and (5) continuing the collapse of said weakened section to develop said bulge into a secondary head and to flare said thinned tubular tip outwardly into engagement with the spacer sleeve at the weakened section thereof, and crowding said secondary head toward and into clamping engagement with said inner face, whereby to clamp said one skin sheet between said secondary head and said outer end head of the spacer sleeve.

2. A method of fabricating a sandwich panel and spacer-type fastener assembly, comprising: providing a hole extending through a low density core of the panel and terminating in apertures in respective skin sheets of the panel; inserting through the aperture of one of said skin sheets a spacer sleeve having an outer end provided with a head engageable against the outer face of the one skin sheet around said aperture and a tubular weakened section joining said head to its main sleeve body, and having an inner end provided with a countersink; inserting through the apertures of the other skin sheet and into the spacer sleeve a plug having an outer end provided with a head and an inner end provided with a thinned tubular tip defined by a counterbore therein, said thinned tubular tip of the plug being located adjacent the weakened section of said spacer sleeve; and successively applying opposed compressive forces to the respective outer end heads and to said tip so as to sequentially effect (1) dimpling of said plug head into the outer surface of said other skin sheet around its said aperture (2) clamping of said other skin sheet between said countersink and said plug head (3) upon completion of said embedding, increasing the compression in the fastener and thereby causing said weakened sleeve section to collapse outwardly adjacent the inner face of said one skin sheet around its aperture, to provide an annular bulge, and (4) continuing the collapse of said weakened section to develop said bulge into a secondary head and to flare said thinned tubular tip outwardly into engagement with the spacer sleeve at the weakened section thereof, and crowding said secondary head toward and into clamping engagement with said inner face, whereby to clamp said one skin sheet between said secondary head and said outer end head of the spacer sleeve.

3. A method of fabricating a sandwich panel and spacer-type fastener assembly, comprising: providing a hole extending through a low density core of the panel and terminating in apertures in respective skin sheets of the panel; inserting through the aperture of one of said skin sheets a spacer sleeve having an outer end provided with a head engageable against the outer face of the one skin sheet around said aperture and a tubular weakened section joining said head to its main sleeve body; inserting through the aperture of the other skin sheet and into the spacer sleeve a plug having an outer end provided with a head having a fluted under face and an inner end provided with a thinned tubular tip defined by a counterbore therein, said thinned tubular tip of the plug being located adjacent the weakened section of said spacer sleeve; and successively applying opposed compressive forces to the respective outer end heads and to said tip so as to sequentially effect (1) clamping of said other skin sheet between the inner end of said sleeve and said plug head (2) embedding said fluted underface into the dimple thus formed (3) upon completion of said clamping, increasing the compression in the fastener and thereby causing said weakened sleeve section to collapse outwardly adjacent the inner face of said one skin sheet around its aperture, to provide an annular bulge, and (4) continuing the collapse of said weakened section to develop said bulge into a secondary head and crowding said secondary head and to flare said thinned tubular tip outwardly into engagement with the spacer sleeve at the weakened section thereof, toward and into clamping engagement with said inner face, whereby to clamp said one skin sheet between said secondary head and said outer end head of the spacer sleeve.

4. A method of fabricating a sandwich panel and spacer-type fastener assembly, comprising: providing a hole extending through a low density core of the panel and terminating in apertures in respective skin sheets of the panel; inserting through the aperture of one of said skin sheets a spacer sleeve having an outer end provided with a head engageable against the outer face of the one skin sheet around said aperture and a tubular weakened section joining said head to its main sleeve body; inserting through the aperture of the other skin sheet and into the spacer sleeve a plug having an outer end provided with a head and an inner end provided with a thinned tubular tip defined by a counterbore therein, said thinned tubular tip of the plug being located adjacent the weakened section of said spacer sleeve; and successively applying opposed compressive forces to the respective outer end heads and to said tip so as to sequentially effect (1) clamping of said other skin sheet between the inner end of said sleeve and said plug head (2) upon completion of said clamping, increasing the compression in the fastener and thereby causing said weakened sleeve section to collapse outwardly adjacent the inner face of said one skin sheet around its aperture, to provide an annular bulge, and (3) continuing the collapse of said weakened section to develop said bulge into a secondary head and to flare said thinned tubular tip outwardly into engagement with the spacer sleeve at the weakened section thereof, and crowding said secondary head toward and into clamping engagement with said inner face, whereby to clamp said one skin sheet between said secondary head and said outer end head of the spacer sleeve.

5. A method of fabricating a sandwich panel and spacer-type fastener assembly, comprising: providing a hole extending through a low density core of the panel and terminating in apertures in respective skin sheets of the panel; inserting through the aperture of one of said skin sheets a spacer sleeve having an outer end provided with a head engageable against the outer face of the one skin sheet around said aperture and a tubular weakened section joining said head to its main sleeve body; inserting through the aperture of the other skin sheet and into the spacer sleeve a plug having an outer end provided with a head and an inner end provided with a thinned tubular tip defined by a counterbore therein, said thinned tubular tip of the plug being located adjacent to the weakened section of said spacer sleeve; and successively applying opposed compressive forces to the respective outer end heads and to said tip so as to sequentially effect (1) clamping of said other skin sheet between the inner end of said sleeve and said plug head (2) upon completion of said clamping, increasing the compression in the fastener and thereby causing said weakened sleeve section to collapse outwardly adjacent the inner face of said one skin sheet around its aperture to provide an annular bulge, and (3) continuing the collapse of said weakened section to develop said bulge into a secondary head engaging the inner side of said one skin sheet at the margin of the aperture therein so as to lock said margin between said secondary head and said outer end head of the spacer sleeve, and to flare said thinned tubular tip outwardly into engagement with the spacer sleeve at the weakened section thereof so as to lock said plug to said spacer sleeve.

6. The method defined in claim 5, including the additional step of providing a fluted underface in the head of said plug and embedding said fluted underface in said other skin sheet in the clamping of said other skin sheet between the inner end of said sleeve and said plug head.

References Cited by the Examiner

UNITED STATES PATENTS

| | | | |
|---|---|---|---|
| 775,728 | 11/04 | Miller | 85—4 X |
| 1,553,967 | 9/25 | Unger. | |
| 2,051,066 | 8/36 | Anderson | 85—40 |
| 2,256,812 | 9/41 | Miller | 29—155 |
| 2,670,021 | 2/54 | Torresen et al. | 85—40 X |
| 2,763,314 | 9/56 | Gill | 85—40 X |
| 2,798,284 | 7/57 | Mudd | 29—155 |
| 2,967,593 | 1/61 | Cushman | 189—34 |
| 3,019,865 | 2/62 | Rohe | 189—34 |
| 3,131,743 | 5/64 | Hinkle | 85—40 X |
| 3,136,203 | 6/64 | Davis | 85—40 |

WHITMORE A. WILTZ, *Primary Examiner.*

HARRISON R. MOSELEY, *Examiner.*